United States Patent [19]

Van Buskirk

[11] 4,310,596

[45] Jan. 12, 1982

[54] SOLAR SELECTIVE SURFACES

[75] Inventor: Oral R. Van Buskirk, Wilmington, Del.

[73] Assignee: E. I. Du Pont de Nemours and Company, Wilmington, Del.

[21] Appl. No.: 132,153

[22] Filed: Mar. 20, 1980

Related U.S. Application Data

[63] Continuation-in-part of Ser. No. 945,322, Sep. 25, 1978, abandoned.

[51] Int. Cl.$^3$ .................. B32B 27/00; B05B 5/00; B05D 3/02; B05D 5/06
[52] U.S. Cl. .................... 428/336; 428/421; 428/422; 428/469; 428/702; 260/42.27; 427/160; 427/162; 427/388.5; 427/401
[58] Field of Search ............ 427/108, 164, 162, 388.5, 427/165, 401, 160; 428/913, 463, 336, 421, 422, 539, 469, 702; 260/42.27, 42, 29.6 F; 72/46; 126/270

[56] References Cited

U.S. PATENT DOCUMENTS

| | | | |
|---|---|---|---|
| 3,444,022 | 5/1969 | Bichsel | 156/281 |
| 3,655,426 | 4/1972 | Fuchs | 428/421 |
| 3,810,777 | 5/1974 | Boebel et al. | 427/160 |
| 3,936,569 | 2/1976 | Miller et al. | 428/421 |
| 4,008,348 | 2/1977 | Slemp | 428/421 |

OTHER PUBLICATIONS

*Optical Coatings for Flat Plate Solar Collectors,* Honeywell, Inc., Sep. 1975.
*Optimization of Coatings for Flat Plate Solar Collectors,* Lin et al., Jul. 1977.

*Primary Examiner*—Michael R. Lusignan

[57] ABSTRACT

Postformable solar selective coatings are disclosed for use on substrates such as aluminum. The coatings use a finely divided black inherently selective spinel pigment such as $Co_3O_4$, $CuCr_2O_4$ or $Cu_xCo_{3-x}O_4$ where x is 0.03 to 0.3 and preferably 0.10 to 0.30. The binders are soluble copolymers of vinylidene fluoride or blends thereof or vinylidene fluoride with a copolymer of methyl methacrylate.

31 Claims, 1 Drawing Figure

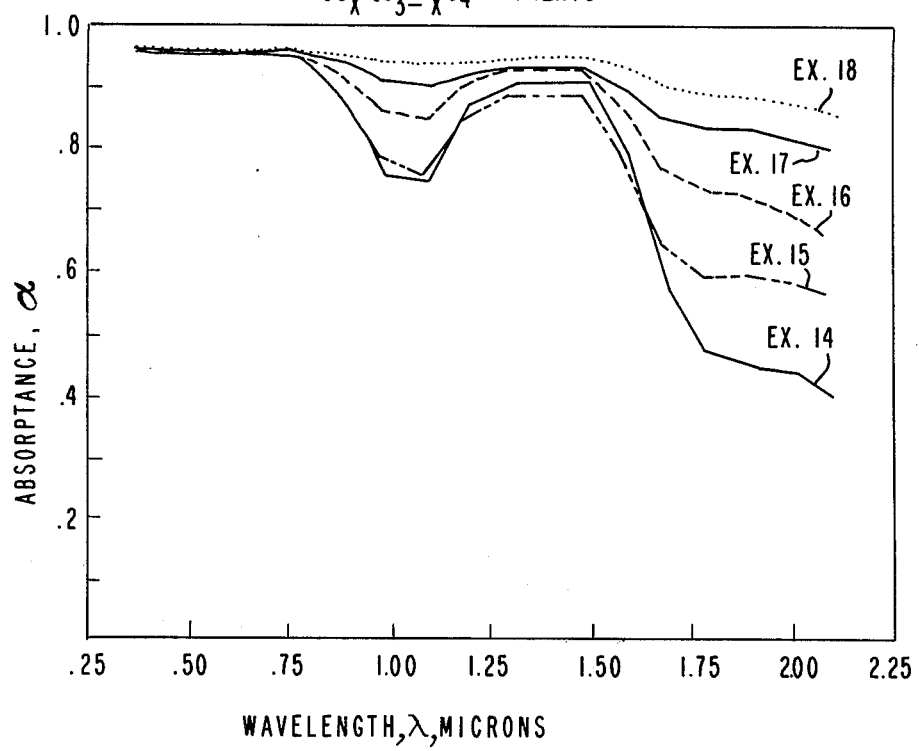

SOLAR SELECTIVE SURFACES

CROSS-REFERENCE TO RELATED APPLICATION

This is a continuation-in-part of Ser. No. 945,322 filed Sept. 25, 1978, now abandoned.

BACKGROUND OF THE INVENTION

1. Field of the Invention

This invention relates to solar selective coatings which can be painted onto suitable substrates which are formable after coating such as a bright aluminum substrate and to the formable, coated substrate. The coatings have sufficient toughness, flexibility and adhesion to enable the coated substrate to be post-formed into the absorber configuration desired for the solar heat collector.

2. Description of the Prior Art

It is known that the efficiency of flat-plate solar collectors can be increased if the solar absorptance of the surface of the collector is increased and the emittance of thermal radiation is decreased. Thus a flat-plate solar collector should have a "solar-selective" surface. This means that the absorptance $\alpha$ of the incident solar radiation with wavelengths ranging from about 0.3 $\mu$m to about 2.5 $\mu$m should be as high as possible and the emittance $\epsilon$ at longer infrared wavelengths of from about 2.5 $\mu$m to about 30 $\mu$m should be as low as possible.

Kokoropoulos, Salem and Daniels, Solar Energy 3 19 (1959) conclude:

"Many combinations of thin coatings of semi-conductors on highly reflecting metals can give surfaces which absorb more than 85 percent of the solar radiation at temperatures somewhat above 100° C. and emit less than 20 percent of the infrared radiation emitted by an ideal blackbody radiator.

"For good selective radiation properties (i.e., high absorption in the solar region (0.3 to 2.5$\mu$) and high transparency and low emissivity in infrared in the general region of 5 to 10$\mu$) the coating must have a thickness ($10^{-5}$–$10^{-4}$ cm) which is about equal to the wavelength of the radiation to be absorbed and about 1/10 or less of the infrared radiation which is emitted by the heated surface.

"The thin coating must be a black semiconductor. There is a close relation between the electrical conductance and the optical properties which in turn are determined by the atomic number and the unfilled electronic shells. The oxides of the transition elements are suitable for such selective radiation coatings. The greater the electrical conductance, the lower the emissivity. A thin film of cupric oxide has a lower emissivity than a thin film of cobalt oxide. The electrical properties of many of the semiconductors are well known, but the optical properties and the emissivity of thin films are less well known. The semiconductors, which increase in conductance as the temperature is raised, should give lower emissivities (in comparison with that of a perfect blackbody radiator) at higher temperatures."

A more recent report is "Optical Coatings for Flat Plate Solar Collectors", Honeywell, Inc., U.S. Dept. of Commerce Report PB-252 383—September 1975. This reports that coating thickness is most important factor in obtaining good selective properties and states that thicknesses less than 0.1 mil (2.5 $\mu$m) are required. Meteor ® 7890 (Harshaw) Cu-CrO$_x$, is listed as one of the two best pigments of the 28 evaluated. About 30 binders were considered for known properties including fluoropolymers but none of the fluoropolymers were actually tested. Olefin binders were judged best. An example of a 0.05 mil (1.27 $\mu$m) coating of Cu-CrO$_x$/ethylene-propylene-diene with a pigment volume concentration of 30% on an aluminum substrate is reported to have an estimated $\alpha \simeq 0.92$ and $\epsilon \simeq 0.30$. All solar paint samples listed used ethylene-propylene-diene, polypropylene, silica, or polyethylene binders. The report indicates that fluorine-containing polymers are spectrally undesirable for this purpose because of the infrared absorption of the C-F bond over the 7-10 $\mu$m range but no fluorine-containing polymers were tested. Despite this teaching away from the use of fluoropolymers, I have discovered how to make desirable post-formable solar selective coatings using certain fluorine containing polymers as binders, which binders are inherently adherent, weather-resistant and heat resistant. Thus it appears that the absorptions referred to in the art are inconsequential.

SUMMARY OF THE INVENTION

This invention provides a solar selective coating comprising a finely divided black, inherently selective pigment dispersed in certain fluorine-containing polymer binders such as copolymers containing vinylidene fluoride or blends containing polyvinylidene fluoride or mixtures thereof. These coatings are especially effective in thin layers on aluminum and the resulting coated aluminum sheet, especially when thin, is post-formable into shapes useful in flat plate solar heat collectors and they are exposure-resistant.

BRIEF DESCRIPTION OF THE FIGURE

The FIGURE is a series of plots of the spectral absorptance of solar radiation of the Cu$_x$Co$_{3-x}$O$_4$ spinel pigment with various values of x.

DETAILED DESCRIPTION OF THE INVENTION

The solar selective paint of this invention is comprised of a finely divided black spinel pigment dispersed in fluoropolymer binder.

The pigment is comprised of a black spinel such as CuCr$_2$O$_4$, Co$_3$O$_4$, CoCr$_2$O$_4$, CoFe$_2$O$_4$, FeCr$_2$O$_4$, ZnFe$_2$O$_4$, Ni$_3$O$_4$, Fe$_3$O$_4$ and CuFeO$_4$. The preferred pigments are CuCr$_2$O$_4$ and Co$_3$O$_4$. Especially preferred are the substituted pigments with the composition Cu$_x$Co$_{3-x}$O$_4$ where x is from about 0.03 to about 0.3 and preferably 0.1 to about 0.3. Most preferred is the composition for which x is about 0.15. The pigment particles should be less than 2 $\mu$m in size and preferably are less than 1 $\mu$m in size. These pigments are radiation selective, i.e., they strongly absorb solar radiation (0.3–2.5 $\mu$m wavelength) and are partially transparent to infrared radiation over the wavelength range of from 2.5 $\mu$m to 30 $\mu$m.

As indicated above, it is desirable for the $\alpha$ to be as high as possible and the $\epsilon$ to be as low as possible. However, $\alpha$ and $\epsilon$ are not properties of the sample which can be varied independently; changes in the sample that increase $\alpha$ tend to increase $\epsilon$ and changes that lower $\epsilon$ tend to lower $\alpha$. In general, for any solar selective pigment or coating there must be a trade-off between $\alpha$ and $\epsilon$. Comparison of different pigments by simply comparing $\alpha$ and $\epsilon$ is difficult since $\alpha$ and $\epsilon$ are not of equal importance for a solar-selective coating on a flat-plate collector. $\alpha$ determines the fraction of the incident solar radiation that is absorbed by the collector. A black body ($\epsilon=1$) radiates at a rate determined by its temperature. The emissivity determines the fraction of the black body radiation actually emitted by the surface in question. It is therefore useful to define a radiation efficiency, $\eta_R$, which translates the $\alpha$ and $\epsilon$ characteristics of a coating into a more meaningful performance index by taking account of the relative magnitude between the incident solar radiation and the black body radiation at the ambient temperature of a collector, i.e., $$\eta_R = \frac{\text{Net useful radiation}}{\text{Total incident radiation}} = \alpha - \frac{\epsilon}{f},$$

where f is the ratio of the magnitude of incident solar radiation to the magnitude of the radiation of a black body at the effective temperature of the collector. This relative magnitude will change depending on the geographic location of the collector, the time of the year, and the collector operating temperature. For the purposes here, the incident radiation is taken as the winter average solar flux incident on a collector oriented in a southernly direction at an angle of 45° at 40° N latitude. Based on Seabrook, N.J. solar data this corresponds to 1283 BTU/day ft² or about 193 BTU/hr ft², assuming a 9½ hr day and a cloudiness factor of 30%. The flat plate collector is assumed to be a typical 2-cover air heating collector at an ambient temperature of 30° F. The inner cover is typically opaque to thermal infrared radiations and operates at a temperature about midway between the absorber and ambient temperatures. Thus the absorber radiation sink temperature is about $$\frac{T_{absorber}+30}{2} °F.$$

The mean absorber temperature for a well-designed collector heating air from 65° F. to 155° F. is about 130° F. and at an ambient temperature of 30° F., the mean inner cover temperature would be approximately 80° F. Under these conditions the black body ($\epsilon=1$) radiation loss would be 62 BTU/hr ft², and the value of f is $$\frac{193 \text{ BTU/hr ft}^2}{62 \text{ BTU/hr ft}^2} = 3.11.$$

The expression for $\eta_R$ becomes $\eta_R = \alpha - 0.322\epsilon$. This figure-of-merit is used to compare different pigments in coatings.

There are a number of known procedures for making spinels. The preferred method for making the radiation selective black spinels of this invention and in particular the preferred copper-substituted cobalt spinels consists of slowly mixing a $CuCl_2.2H_2O$-$CoCl_2.6H_2O$ aqueous solution with an aqueous solution of $Na_2CO_3.H_2O$, washing and drying the resultant precipitate and then firing in air at temperatures of from 275° C. to about 430° C. for from about 30 minutes to about 16 hours, the longer firing time being necessary with lower firing temperatures. $Cu_xCo_{3-x}O_4$ spinels can also be prepared by firing precipitates obtained by precipitation from aqueous chloride solutions using sodium hydroxide and oxalic acid; from aqueous sulfate solutions using sodium carbonate and acetone; and from aqueous acetate and nitrate solutions using sodium carbonate. This preferred method results in spinel crystallites less than 1 μm in size, and typically of the order of 250A (0.025 μm), which permits high loading in thin coatings and greatly facilitates dispersion milling.

The binder should be easily processed into a coating composition, adherent to the collector substrate, and stable under exposure to heat and light as is experienced under operating conditions. The binder should be sufficiently elastic to permit post-forming of the coated substrate. At least one of the binder polymeric components should be substantially soluble in one or more of the solvents especially at the curing temperature. Binders which best satisfy all these requirements include substantially soluble resinous polymeric compositions containing from 50 to 95 mole percent vinylidene fluoride in polymerized form. The tetrafluoroethylene content, if any, should be less than about 20 mole percent, and the remainder other vinyl comonomers yielding substantially soluble copolymers or other vinyl polymers or copolymers that are compatible in the blends with the vinylidene fluoride-containing or polyvinylidene fluoride-containing components and which are also heat stable and radiation stable. It is known in the art that chlorotrifluoroethylene can be substituted for tetrafluoroethylene in vinylidene fluoride-containing copolymers with little change in properties. As shown by Examples 10 and 11, it appears that the use of tetrafluoroethylene as a comonomer does not enhance the wetting and adhesion of vinylidene fluoride-containing finishes on bright aluminum. In Example 10 where the binder copolymer contains about 16.1 mole percent tetrafluoroethylene, wetting is adequate but adhesion of the dried coating on bright aluminum is marginal. In Example 11, where the binder copolymer contains about 25.3 mole percent tetrafluoroethylene, both wetting and adhesion of the dried coating on bright aluminum are unsatisfactory. It is possible however, that copolymers containing more than about 25 mole percent tetrafluoroethylene might wet and adhere to bright metal surfaces other than aluminum.

Polyvinylidene fluoride powder does not grind well when formulating the coating composition which results in an undesirably gritty coating composition. Thus either copolymers of vinylidene fluoride or blends of polyvinylidene fluoride are used as binder resins in the present invention. Generally the binder is a substantially soluble resinous material containing in polymerized form from about 50 to about 95 mole percent vinylidene fluoride, up to about 20 mole percent tetrafluoroethylene or chlorotrifluoroethylene, up to 2 mole percent 3(2'-methacryloxyethyl) 2,2-spirocyclohexyl oxazolidine and the remainder methyl methacrylate, hexafluoropropylene, vinyl butyrate or trifluoromethyltrifluorovinyl ether. The resinous material may be formed of a copolymer, terpolymer or blend. The preferred blend for use as a binder contains from about 80 to 95 mole percent of solid polyvinylidene fluoride with from about 5 to 20 mole percent of a normally solid acrylic copolymer containing from 98 to 99.5 mole percent methyl methacrylate and from 0.5 to 2 mole percent 3(2'-methacryloxyethyl) 2,2-spirocyclohexyl oxazolidine. The most preferred blend for use as a binder contains about 90 mole percent of solid polyvinylidene fluoride and about 10 mole percent of a normally solid acrylic copolymer containing 98 to 99.5 mole percent methyl methacrylate and 0.5 to 2 mole percent 3(2'-methacryloxyethyl) 2,2-spirocyclohexyl oxazolidine. Generally the binder volume concentration in the solids content of the coating composition of the present invention ranges from 50% to about 85%. The binder weight concentration in the solids content of the coating composition of the present invention ranges from about 20% to about 60%.

The pigment volume concentration in the solids content of the coating composition of the present invention ranges from about 15% to about 50%. The pigment weight comprises from about 40% to about 80% the total weight of the solids content of the coating composition.

Generally the pigment and binder will constitute from 25 to 75 wt. % and preferably from 40 to 70 wt. % of the coating composition depending on the application method being used and solvents from 25 to 75 wt. %, preferably 30 to 60 wt. %. The solvent should at least swell the binder. The solvents are volatile normally liquid organic materials. Suitable solvents are aromatic hydrocarbons having boiling points in the range of 180° C. to 220° C. at 760 mm Hg, ketones such as methyl ethyl ketone, acetone and isophorone; lactones such as butyrolactone; esters such as n-butylacetate; and ethers such as cellosolve (ethylene glycol monoethylether).

The substrate materials to which the solar selective coating is applied in the present invention are preferably highly reflective materials. Highly reflective surfaces necessarily have low emissivities. Bright metals are preferred. Useful substrate materials include aluminum, steel, iron, stainless steel, copper, nickel, and zinc. Aluminum is preferred. The thickness of the aluminum substrate will generally lie between about 5 mils and about 15 mils (0.127 mm and about 0.38 mm) for low cost and post-formability when coated, but can be thicker if needed for structural strength.

The solar selective coated substrate of this invention generally will have a coating of about 10 $\mu$m or less of thickness and preferably between about 0.5 $\mu$m and about 2.5 $\mu$m. Coatings of the present invention within this preferred thickness range generally have solar absorptances larger than 0.85 and infrared emittances less than 0.5. Thicker coatings, about 2.5 $\mu$m to about 10 $\mu$m can be prepared with perhaps slightly greater absorptances but the emittances of such thicker coatings often are undesirably high.

To test the post-formability and performances of the coated aluminum sheet of this invention, pieces of the 12 mil (0.305 mm) sheet were bent 90° to provide an outer radius of approximately 0.04–0.06 inch (1–1.5 mm) on the coated side. The samples were then subjected to a simulated weather exposure test (ASTM D-1499) for 400 hours. Duplicate samples were heated at 400° F. for 480 hours to test thermal stability. The absorptance and emittance were measured initially and after each of the above tests. The absorptance was calculated from spectral reflectance data. The emittance was measured calorimetrically. These exposure and heat tests had little effect on the absorptance and emittance of the samples of this invention. The absorptances decreased to more than about 0.02 and the emittances increased no more than about 0.07.

The coatings within the preferred thickness range showed no cracking at the 90° bends and adhered well to the aluminum after all the above tests. Some of the thickest coatings (approximately 10 $\mu$m thick) did crack at the bends but they still adhered well to the aluminum after all tests and the cracks appeared to in no way affect the performance of the coated aluminum.

Adhesion of the coating to the aluminum surface is tested by scratching a 9-square grid on the coating. Each coating grid is about ⅛" (3 mm) on a side.

Scotch ® (Magic) tape is applied to the grid and then removed by pulling vertically upward. The number of intact squares are counted as a measure of the adhesion. For the most preferred coatings of this invention all 9 squares were intact both before and after the accelerated exposure tests.

EXAMPLES 1–2

In each of Examples 1–2, 6.0 g of 20–30 mesh Ottawa sand, 3.0 g of a 20 percent by weight solution of a solid copolymer containing 39 weight %, 60 mole %, vinylidene fluoride and 61 weight, 40 mole %, hexafluoropropylene in methyl ethyl ketone, 4.0 g of n-butyl acetate, 1.1 g of finely divided $CuCr_2O_4$ pigment, 2 drops (0.019 g/drop) of Alcolec ® 329 are added in this order to a 28 ml screw-top glass vial. Alcolec ® 329 is a lecithin ($C_{42}H_{84}O_9PN$) and is used as a dispersing agent. The top of the vial is screwed on the vial and sealed with tape. The sealed vial is agitated in a Spex ® oscillating-type shaker (Catalogue #8000) for 4–5 hours. The solution is then filtered through a glass wool plug in the bottom of a hypodermic syringe. Coatings are applied to 1.25 in (3.18 cm) diameter disks of 0.012 in (0.3 mm) thick 1145-H19 nameplate finish aluminum foil by spin coating for 30 seconds at speeds of 6000 rpm and 4000 rpm for Examples 1 and 2, respectively. The coatings are air dried for from 1–2 hours, and the samples evaluated. Results are shown in Table I.

EXAMPLES 3–4

Examples 3–4 are prepared in a manner identical to that used for Examples 1–2 except that 3.0 g of methyl ethyl ketone is used in place of the n-butyl acetate. Example 3 is spin coated at a coating speed of 6000 rpm for 30 seconds; Example 4 at 3000 rpm for 30 seconds.

TABLE I

| Ex. No. | Aluminum Substrate Thickness mils | Coating Weight mg/ft$^2$ | Calculated* Coating Thickness ($\mu$m) | Solar Absorptance $\alpha$ | Infrared Emittance $\epsilon$ |
|---|---|---|---|---|---|
| 1 | 12 | 164 | 0.6 | .87 | .23 |
| 2 | 12 | 246 | 1.0 | .90 | .28 |
| 3 | 12 | 352 | 1.4 | .91 | .32 |
| 4 | 12 | 528 | 2.1 | .94 | .48 |

*Calculated from the coating weight by assuming that 30% of the pigment volume is made up of voids that the binder does not fill.

EXAMPLE 5

6.0 g of 20–30 mesh Ottawa sand, 3.0 g of a 20 percent by weight solution of the polymer binder used in Example 1 in methyl ethyl ketone, 0.5 g of methylethyl ketone, 1.1 g of $Co_3O_4$ pigment having an average particle size of less than 1 micron, 2 drops (0.019 g/drop) of Alcolec ® 329 are added in this order to a 28 ml screw-top glass vial. The top of the vial is screwed on the vial and sealed with tape. The sealed vial is agitated in a Spex ® oscillating-type shaker (Catalogue #8000) for 3 hours. The solution is then filtered through a glass wool plug in the bottom of a hypodermic syringe. Coatings are drawn on a 0.012 in (0.3 mm) thick, 1145-H19 nameplate finish aluminim foil using a 2-inch (5.08 cm) wide box knife with a knife clearance of 0.002 in (0.0508 cm), and air dried. The sample is divided appropriately for evaluation. Results are shown in Tables II and III.

EXAMPLE 6

Finely divided Co₃O₄ having an average particle size of less than 1 micron (31.1 parts by weight) are combined with 100 parts by weight of a vehicle containing 13.00 parts by weight aromatic hydrocarbons boiling in the range of 182° to 219° C., 30.30 parts by weight of isophorone, 18.93 parts by weight of a 35 weight percent solution of solid acrylic resin containing 95 weight percent methylmethacrylate and 5 weight percent 3(2'-methacryloxyethyl) 2,2-spirocyclohexyl oxazolidine, 37.53 parts by weight solid polyvinylidene fluoride powder, and 0.24 parts by weight of Thermolite-31 (a sulfur containing organotin compound containing 18 weight percent tin and 10 weight percent mercaptosulfur). The mixture is milled for 5 passes in a sand mill, and the dispersion coated on a 0.012 inch (0.3 mm) thick 1145-H19 nameplate finish aluminum foil using a #10 wire wound rod. The coated panel is immediately cured for 10 seconds in a high velocity, forced circulation oven at 500° F. (260° C.) giving a peak metal temperature of 450° F. (232° C.) and quenched in water at room temperature. The results are reported in Tables II and III.

EXAMPLE 7

The coated aluminum foil in this example is prepared in a manner identical to Example 6 except that 37.7 parts by weight of the finely divided Co₃O₄ are combined with 100 parts by weight of the vehicle described in Example 6. The results are reported in Tables II and III.

EXAMPLE 8

Finely divided Co₃O₄ (1.41 g) having an average particle size of less than 1 micron, 3.0 g of the dispersion prepared in Example 6, 2.0 g of isophorone, and 6.0 g of 20-30 mesh Ottawa sand are added to a 28 ml screw-top glass vial and processed in a manner identical to that used in Example 5 with the following exception. Immediately after coating, the panel is cured for 20-30 seconds in a forced-circulation air oven at 500° F. (260° C.) and quenched in water at room temperature. The results are reported in Tables II and III.

EXAMPLE 9

This sample is prepared in a manner identical with Example 8 except that 2.23 g of the Co₃O₄ is used. The results are reported in Tables II and III.

EXAMPLE 10

6.0 g of 20-30 mesh Ottawa sand; 3.0 g of a 20 percent by weight stock solution of a terpolymer comprising 68 weight percent, 77.5 mole percent, vinylidene fluoride, 22 weight percent, 16.1 mole percent, tetrafluoroethylene, and 10 weight percent, 6.4 mole percent, vinyl butyrate in methyl ethyl ketone; plus an additional 0.5 g of methyl ethyl ketone; 1.1 g of finely divided Co₃O₄ as used in Example 5; and 2 drops (0.019 g/drop) of Alcolec ® 329 are added to a 28 ml screw-top glass vial processed in a manner identical to that used in Example 5 except that the agitation time is 2⅔ hrs. The sample is divided appropriately for evaluation. Results are shown in Tables II and III.

EXAMPLE 11

6.0 g of 20-30 mesh Ottawa sand; 3.0 g of a 20% by weight solution of a terpolymer comprising 29.1 weight percent, 45 mole percent, vinylidene fluoride, 25.3 weight percent, 25 mole percent, tetrafluoroethylene, and 45.6 weight percent, 30 mole percent, hexafluoropropylene in n-butyl acetate; 3.0 g of cellosolve; 1.1 g of finely divided CuCr₂O₄ as used in Examples 1-4; and 2 rops (0.019 g/drop) of Alcolec ® 329 are added to a 28 screw-top glass vial. The sample is sealed, agitated for 4 hours, and filtered as in Examples 1-4. Attempts to apply the coating to 1.25 in (3.18 cm) disks of 0.012 in (0.3 mm) thick 1145-H19 nameplate finish aluminum foil by spin coating at 3000 rpm and 6000 rpm were unsuccessful. The coating did not appear to wet the aluminum and was totally flung off. In order attempts, coatings were drawn on the same aluminum foil substrate using a 2-inch (5.08 cm) wide box knife with a knife clearance of 0.002 in (0.0508 mm). The film separated in several places while air drying indicating poor wetting and the resulting dried coatings were essentially non-adherent.

| Ex. No. | Binder | Pigment Fraction Wt. | Pigment Fraction Vol. | Coating Weight mg/ft² | Coating Thickness (μm) | Adhesion Rating |
|---|---|---|---|---|---|---|
| 5 | VF₂—HFP | .65 | .39 | 1689 | 6.8 | 9 |
| 6 | PVF₂/Acrylic (90/10 mole ratio) | .41 | .18 | 798 | 4.0 | 9 |
| 7 | PVF₂/Acrylic (90/10 mole ratio) | .46 | .21 | 809 | 3.9 | 9 |
| 8 | PVF₂/Acrylic (90/10 mole ratio) | .68 | .40 | 2498 | 10.0 | 9 |
| 9 | PVF₂/Acrylic (90/10 mole ratio) | .74 | .48 | 2651 | 10.2 | 9 |
| 10 | VF₂—TFE—VB | .65 | .39 | 2252 | 8.8 | 0 |

*Calculated in manner used for Examples 1-4.

TABLE III

RADIATION PROPERTIES

| Ex. No. | As Prepared α | As Prepared ε | After 400 hrs Weather-O-Meter* Test-ASTM-D-1499 α | After 400 hrs Weather-O-Meter* Test-ASTM-D-1499 ε | After 480 hrs. at 480° F. α | After 480 hrs. at 480° F. ε |
|---|---|---|---|---|---|---|
| 5 | .94 | .55 | .92 | .59 | .93 | .54 |
| 6 | .90 | .50 | .88 | .52 | .90 | .49 |
| 7 | .88 | .46 | .87 | .45 | .91 | .39 |
| 8 | .91 | .67 | .91 | .74 | .93 | .50 |
| 9 | .93 | .66 | .93 | .73 | .94 | .49 |
| 10 | .94 | .66 | .93 | .66 | .95 | .62 |

α - Solar absorbtance calculated from spectral reflectance data.
ε - Infrared emittance measured calorimetrically.
*Weather-O-Meter samples had two 90° bends.

EXAMPLES 12 AND 13

Six grams of 20-30 mesh Ottawa sand, 3.0 grams of a vehicle containing 13.00 parts by weight aromatic hydrocarbons boiling in the range of 182° to 219° C., 30.30 parts by weight of isophorone, 18.93 parts by weight of a 35 weight percent solution of solid acrylic resin containing 95 weight percent methylmethacrylate and 5 weight percent 3(2'-methacryloxyethyl) 2,2-spirocyclohexyl oxazolidine, 37.53 parts by weight solid polyvinylidene fluoride powder, and 0.24 parts by weight of Thermolite-31 (a sulfur containing organotin compound containing 18 weight percent tin and 10 weight percent mercaptosulfur), 3 grams of finely divided $Cu_xCo_{3-x}O_4$ having the composition reported in Table IV and having an average particle size of less than 1 micron and an additional 1.5 g in Example 12, 1.4 g in Example 13 of a solvent which is a 2.33/1 mixture of isophorone and aromatic hydrocarbons boiling in the range of 182°–219° C., are added in that order to a 28 ml screw-top vial. The vial is tape sealed and agitated in a "Spex" mixer mill (Cat. No. 800) for between 5 and 6 hours which is stopped briefly for cooling every half hour. The composition is then filtered through a glass wool plug in the bottom of a hypodermic syringe. The composition is then spin-coated on 1¼ inch (31.75 mm) diameter disks of 0.012 inch (0.3 mm) thick 1145-H19 aluminum (nameplate finish) at the rpm reported in Table IV. The coating is cured immediately in a forced-circulation air oven for 2 minutes at 500° F. (260° C.). The solar absorptance, $\alpha$, is determined by weighted integration of measured absorptance spectra over the terrestrial solar spectrum. The overall IR emittance, $\epsilon$, is determined in a radiation calorimeter.

TABLE IV

| Example | Pigment | Spin RPM | Nominal* Coating Thickness $\mu m$ | $\alpha$ | $\epsilon$ | $\eta_R$ |
|---|---|---|---|---|---|---|
| 12 | $Cu_{0.08}Co_{2.92}O_4$ | 6600 | 1.55 | .93 | .34 | .82 |
| 13 | $Cu_{0.1}Co_{2.9}O_4$ | 6000 | 1.41 | .94 | .32 | .84 |

*Calculated in manner used for Examples 1–4.

EXAMPLES 14–1

In order to show the superiority of the Cu-substituted-$Co_3O_4$ spinels over the other spinel pigments, a series of coatings were prepared using Cu-substituted-$Co_3O_4$ spinels containing different amounts of Cu and the performance compared with similar coatings containing $Co_3O_4$ and $CuCr_2O_4$, the two best unsubstituted spinel pigments. A polyisobutylene binder was used to minimize the emissive contribution of the binder in order to avoid masking changes in the emissive contributions of the pigments.

The pigment used in the coatings of Examples 14–18 were prepared in the following manner. For each Example, the amounts of $CuCl_2.2H_2O$ and $CoCl_2.6H_2O$ shown in Table V were dissolved in 400 ml of distilled water at room temperature and half of the resulting solution was charged to an Oster® or Waring® blender.

TABLE V

| Ex. No. | Pigment | $CuCl_2 \cdot 2H_2O$ (grams) | $CoCl_2 \cdot 6H_2O$ (grams) | Firing Time (hrs) |
|---|---|---|---|---|
| 14 | $Co_3O_4$ | 0 | 64.3 | 4 |
| 15 | $Cu_{0.038}Co_{2.962}O_4$ | .629 | 69.37 | 4 |
| 16 | $Cu_{.1}Co_{2.9}O_4$ | 1.70 | 68.99 | 16 |
| 17 | $Cu_{.15}Co_{2.85}O_4$ | 2.54 | 67.50 | 4 |
| 18 | $Cu_{.3}Co_{2.7}O_4$ | 5.11 | 64.30 | 16 |

A second solution was slowly added to the solution in the blender through a submerged tube located just above the impeller while the blender was running at full speed. For Examples 14, 15 and 17 this second solution was comprised of 42 grams of $Na_2CO_3$ in 300 ml of distilled water. For Examples 16 and 18, this second solution was comprised of 42 grams of $Na_2CO_3.H_2O$ in 300 ml of distilled water. In each of these Examples half of the prepared second solution was added to the blender.

Agitation was continued for approximately 15 minutes after addition of the second solution was complete and the procedure was repeated using the other half of each solution. The slurry was vacuum filtered on a medium-frit Buchner funnel. Washing was carried out using 3 reslurrying and refiltrations in room temperature distilled water with the blender at full speed. The cake product was given in final displacement wash with dry acetone and dried in air at 120°–130° C. The dried cake was broken up and was air-fired at 400° C. for the times indicated in Table V.

The pigment used in Example 19 was finely divided $CuCr_2O_4$, obtained commercially.

The coating for each of these Examples was prepared by adding to a 28 ml screw-top glass vial in the order given the following parts by weight: 6 grams of 20–30 mesh Ottawa sand, 3 grams of 9.5% (wt) solution of polyisobutylene in n-octane, the amount of n-octane shown in Table VI for each Example, 1.1 grams of the pigment for that Example, and the amount of Alcolec® 329 shown in Table VI. The top of the vial was screwed on and sealed with tape. The sealed vial was agitated in the Spex® oscillating-type shaker for 4–6 hours. The solution was then filtered through a glass wool plug in the bottom of a hypodermic syringe. Coatings were applied to 1.25 in (3.18 cm) diameter disks of 0.012 in (0.03 mm) thick 1145-H19 nameplate finish aluminum by spin coating for 30 seconds at the rpm shown in Table VI.

TABLE VI

| Example Number | n-octane grams | Alcolec® 329 grams | rpm |
|---|---|---|---|
| 14 | 2.0 | .06 | 6600 |
| 15 | 2.0 | .06 | 4500 |
| 16 | 2.5 | .08 | 3500 |
| 17 | 2.0 | .06 | 5500 |
| 18 | 1.5 | .04 | 6000 |
| 19 | 1.5 | .04 | 5000 |

The coatings were air dried for 1–2 hours. The overall solar absorptance $\alpha$ was obtained by a weighted integration of the absorptance spectra over the terrestial solar spectrum. The overall infrared emittance was obtained directly in a radiation calorimeter for Examples 16, 18 and 19 and by integration of emission spectra as measured by an inteferometer infrared spectrophotometer from Examples 14, 15 and 17. The results of these measurements and the figure-of-merit, $\eta_R$ are shown in Table VII.

TABLE VII

| Ex. No. | Pigment | Calculated Coating* Thickness ($\mu m$) | Solar Absorptance $\alpha$ | Infrared Emittance $\epsilon$ | FIG. of Merit $\eta_R$ |
|---|---|---|---|---|---|
| 14 | $Co_3O_4$ | 1.30 | .90 | .28 | .81 |
| 15 | $Cu_{.038}Co_{2.962}O_4$ | 1.24 | .91 | .26 | .83 |
| 16 | $Cu_{.1}Co_{2.9}O_4$ | 1.51 | .92 | .29 | .83 |
| 17 | $Cu_{.15}Co_{2.85}O_4$ | 1.40 | .95 | .31 | .85 |
| 18 | $Cu_{.3}Co_{2.7}O_4$ | 1.30 | .96 | .35 | .85 |
| 19 | $CuCr_2O_4$ | 1.35 | .90 | .31 | .80 |

*Calculated in the manner used for Examples 1–4.

The improvement in performance of the copper-substituted spinels over $Co_3O_4$ can be understood by comparing the absorptance spectra over the 0.35–2.1 $\mu m$ terrestial solar spectral region as shown in the drawing for Examples 14–18. $Co_3O_4$ absorptance shows a deep and fairly broad "window" between 0.75 and 1.25 $\mu m$ and a relatively sharp cut-off starting at about 1.5 $\mu m$. Addition of Cu results in a filling in of the window and an increase in absorptance above 1.5 $\mu m$ as seen in the drawing.

I claim:

1. A coating composition comprising from about 25 to 75 weight percent of a volatile normally liquid organic solvent and from 25 to 75 weight percent of solids which solids consist essentially of from about 40 weight percent to about 80 weight percent of a black spinel pigment selected from the group consisting of $Co_3O_4$, $CuCr_2O_4$ and $Cu_xCo_{3-x}O_4$ where x is from 0.03 to 0.3 and from about 20 weight percent to about 60 weight percent of a substantially soluble resinous binder which is polymerized form contains from about 50 to about 95 mole percent vinylidene fluoride, up to about 20 mole percent tetrafluoroethylene or chlorotrifluoroethylene or mixtures thereof, up to 2 mole percent 3(2'-methacryloxyethyl) 2,2-spirocyclohexyl oxazolidine, and the remainder any one or more of methyl methacrylate, hexafluoropropylene, vinyl butyrate or trifluoromethyltrifluorovinyl ether.

2. The composition of claim 1 wherein the binder is a blend containing from about 80 to 95 mole percent polyvinylidene fluoride and about 5 to 20 mole percent of a copolymer containing 98 to 99.5 mole percent methyl methacrylate and 0.5 to 2 mole percent 3(2'-methacryloxyethyl) 2,2-spirocyclohexyl oxazolidine.

3. The composition of claim 2 wherein the pigment is $Co_3O_4$.

4. The composition of claim 2 wherein the pigment is $CuCr_2O_4$.

5. The composition of claim 2 wherein the pigment is $Cu_xCo_{3-x}O_4$.

6. The composition of claim 2 wherein x is from about 0.1 to 0.3.

7. The coating composition of claim 1 wherein the binder is a copolymer of about 60 mole percent vinylidene fluoride and about 40 mole percent hexafluoropropylene.

8. The composition of claim 7 wherein the pigment is $Co_3O_4$.

9. The composition of claim 7 wherein the pigment is $CuCr_2O_4$.

10. The composition of claim 7 wherein the pigment is $Cu_xCo_{3-x}O_4$.

11. The composition of claim 7 wherein x is about 0.1 to 0.3.

12. The process comprising applying a composition comprising from 25 to 75 weight percent of a volatile normally liquid organic solvent and from 25 to 75 weight percent solids which solids consist essentially of from about 40 weight percent to about 80 weight percent of a black spinel pigment selected from the group consisting of $Co_3O_4$, $CuCr_2O_4$ and $Cu_xCo_{3-x}O_4$ where x is from 0.03 to 0.3 and from about 20 weight percent to about 60 weight percent of a substantially soluble resinous binder which in polymerized form contains from about 50 to about 95 mole percent vinylidene fluoride, up to about 20 mole percent tetrafluoroethylene or chlorotrifluoroethylene or mixtures thereof, up to 2 mole percent 3(2'-methacryloxyethyl) 2,2-spirocyclohexyl oxazolidine, and the remainder any one or more of methyl methacrylate, hexafluoropropylene, vinyl butyrate, or trifluoromethyltrifluorovinyl ether, to a shiny metal surface and volatilizing the solvent to obtain a coating from about 0.5 μm to about 10 μm in thickness, and bending the coating substrate to form a solar absorber.

13. A metal substrate having intimately adhered thereto a coating from about 0.5 μm to about 10 μm in thickness which coating consists essentially of from about 40 weight percent to about 80 weight percent of a black spinel pigment selected from the group consisting of $Co_3O_4$, $CuCr_2O_4$ and $Cu_xCo_{3-x}O_4$ where x is from 0.03 to 0.3, and from about 20 weight percent to about 60 weight percent of a substantially soluble resinous binder which in polymerized form contains from about 50 to about 95 mole percent vinylidene fluoride, up to about 20 mole percent tetrafluoroethylene, chlorotrifluoroethylene or mixtures thereof, up to 2 mole percent 3(2'-methacryloxyethyl) 2,2-spirocyclohexyl oxazolidine, and the remainder any one or more of methyl methacrylate, hexafluoropropylene, vinyl butyrate, or trifluoromethyltrifluorovinyl ether.

14. The coated metal substrate of claim 13 wherein the blend contains from about 80 to 95 mole percent polyvinylidene fluoride and 5 to 20 mole percent of a copolymer containing 98 to 99.5 mole percent methyl methacrylate and 0.5 to 2 mole percent 3(2'-methacryloxyethyl) 2,2-spirocyclohexyl oxazolidine.

15. The coated metal substrate of claim 14 wherein the final coating is from about 0.5 μm to about 2.5 μm in thickness.

16. The coated substrate of claim 15 wherein the substrate is aluminum.

17. The coated substrate of claim 16 wherein the pigment is $Co_3O_4$.

18. The coated substrate of claim 16 wherein the pigment is $CuCr_2O_4$.

19. The coated substrate of claim 16 wherein the pigment is $Cu_xCo_{3-x}O_4$.

20. The coated substrate of claim 19 wherein x is from about 0.1 to 0.3.

21. The coated metal substrate of claim 13 wherein the binder is a copolymer of about 60 mole percent vinylidene fluoride and about 40 mole percent hexafluoropropylene.

22. The coated metal substrate of claim 21 wherein the coating is from about 0.5 μm to 2.5 μm in thickness.

23. The coated metal substrate of claim 22 wherein the metal is aluminum.

24. The coated metal substrate of claim 23 wherein the pigment is $Co_3O_4$.

25. The coated metal substrate of claim 23 wherein the pigment is $CuCr_2O_4$.

26. The coated metal substrate of claim 23 wherein the pigment is $Cu_xCo_{3-x}O_4$.

27. The coated substrate of claim 26 wherein x is 0.1 to 0.3.

28. A coating composition comprising from about 25 to 75 weight percent of a normally liquid organic solvent and from 25 to 75 weight percent of solids which solids contain from about 40 weight percent to about 80 weight percent of a black spinel pigment of the formula $Cu_xCo_{3-x}O_4$ where x is from 0.03 to 0.3 and from 20 to about 60 weight percent of a resinous binder.

29. The composition of claim 28 wherein x is from about 0.1 to 0.3.

30. A metal substrate having intimately adhered thereto a coating from about 0.5 μm to about 10 μm in thickness which coating contains from about 40 weight percent to about 80 weight percent of a black spinel pigment of the formula $Cu_xCO_{3-x}O_4$ where x is from 0.03 to 0.3, and from about 20 weight percent to about 60 weight percent of a resinous binder.

31. The coated substrate of claim 30 wherein x is from about 0.1 to 0.3.

* * * * *